United States Patent Office 3,755,438
Patented Aug. 28, 1973

3,755,438
PRODUCTION OF SELENIUM COMPOUNDS
Patrick Joseph Keogh, Ilford, England, assignor to Ilford Limited, Ilford, England
No Drawing. Filed Sept. 22, 1971, Ser. No. 182,836
Int. Cl. C07f 11/00
U.S. Cl. 260—551 R
6 Claims

ABSTRACT OF THE DISCLOSURE

A process for the production of selenosemicarbazides by reacting a selenosemicarbazone with a hydrazine is disclosed.

---

The present invention relates to a process for the production of a selenosemicarbazide of the general formula

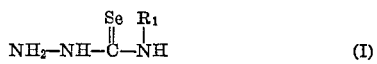

(I)

wherein $R_1$ represents a hydrogen atom or an alkyl, aryl, aralkyl or heterocyclic group, which comprises reacting at a temperature above 20° C. a selenosemicarbazone of the general formula

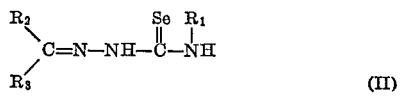

(II)

where $R_1$ has the meaning given above, one of $R_2$ and $R_3$ is a hydrogen atom or an alkyl or aralkyl group and the other of $R_2$ and $R_3$ is an alkyl or aralkyl group or together they represent the atoms necessary to complete a carbocyclic group, with a free hydrazine of the general formula

(III)

wherein $R_4$ is a hydrogen atom, a lower alkyl group, a substituted lower alkyl group, an aryl group or an aralkyl group, or with a hydrate of a hydrazine of the above Formula III, in the presence of an inert organic solvent.

By lower alkyl group is meant an alkyl group which comprises from 1 to 6 carbon atoms.

An example of a substituted alkyl group is an hydroxyalkyl group.

The preferred hydrazine for use in the process of the present invention is hydrazine itself, i.e. $NH_2$—$NH_2$.

The preferred selenosemicarbazones for use in the process of the present invention are those where $R_2$ and $R_3$ together represent the residue of a cyclohexanone. A process for the preparation of one class of cyclohexanone-selenosemicarbazones is described in co-pending application No. 182,837 (corresponding to British applacation No. 46,528/70) filed on even date herewith. Other selenosemicarbazones of particular use in the process of the present invention are listed in Example I which follows.

Preferably the process of the invention is carried out in the presence of no more water than is usually present in the solvent and added reagent, since the presence of approximately 20% v./v. water in ethanol reduces the yield to 70% as in Example V.

Preferably the inert organic solvent used in the process is a poor solvent for the resultant selenosemicarbazide. Examples of suitable solvents are lower alcohols, such as methanol, ethanol and isopropanol and dioxan.

Preferably the process of the present invention is carried out at a temperature ranging from 20 to 120° C. since the yield of the selenosemicarbazide is reduced if the temperature exceeds 120° C.

Preferably in the process of the present invention 0.5–1.0 mole of the hydrazine or hydrazine hydrate is used per mole of the selenosemicarbazone.

The selenosemicarbazides produced according to the process of the present invention are usable as photographic bleach-fix accelerators.

EXAMPLE I

To a solution of 2.18 g. cyclohexanoneselenosemicarbazone (0.01 mol) in 50 ml. boiling ethanol are added 0.5 g. of hydrazine hydrate (0.01 mol), whereupon almost immediately a thick paste forms. The mixture is boiled for about 15 minutes to digest the paste to a dense crystalline product and, after cooling, 1.28 g. of selenosemicarbazide M.PT. 182° C. are collected by filtration. Two recrystallisations from ethanol afford material of the M.PT. 183° C. with decomposition.

In an exactly similar manner the selenosemicarbazones of the carbonyl compounds tabulated below are converted to selenosemicarbazide in the yield and purity (M.PT.) shown:

| Selenosemicarbazone of— | Yield | M.PT., ° C. |
|---|---|---|
| Propionaldehyde | 83 | 182 |
| n-Butyraldehyde | 84 | 181 |
| Acetone | 90 | 182 |
| Ethyl methyl ketone | 88 | 182 |
| Diethyl ketone | 88 | 182 |
| Cyclopentanone | 86 | 182 |
| Cycloheptanone | 90 | 183 |

EXAMPLE II

To a solution of 2.18 g. cyclohexanoneselenosemicarbazone (0.01 mol) in 50 ml. boiling isopropanol are added 0.5 g. of hydrazine hydrate (0.01 mol), whereupon almost immediately a thick paste forms. The mixture is boiled for about 15 minutes to digest the paste to a dense crystalline product and, after cooling, 1.33 g. of selenosemicarbazide M.PT. 181° C. are collected by filtration.

EXAMPLE III

To a solution of 2.18 g. cyclohexanoneselenosemicarbazone (0.01 mol) in 17 ml. boiling methanol are added 0.5 g. of hydrazine hydrate (0.01 mol) whereupon almost immediately a thick paste forms. The mixture is boiled for about 15 minutes to digest the paste to a dense crystalline product and, after cooling, 1.28 g. of selenosemicarbazide M.PT. 179 are collected by filtration.

EXAMPLE IV

To a solution of 4.36 g. cyclohexanoneselenosemicarbazone (0.02 mol) in 20 ml. hot (about 90° C.) dioxan is added 1.0 g. of hydrazine hydrate (0.02 mol), whereupon dense crystals appear almost immediately and, after cooling, 2.35 g. of selenosemicarbazide M.PT. 183° C. are collected by filtration.

EXAMPLE V

To 4.36 g. cyclohexanoneselenosemicarbazone (0.02 mol) dissolved in a warmed mixture of 100 ml. ethanol and 25 ml. water and then cooled to 20° C. is added 1.0 g. of hydrazine hydrate (0.02 mol). Upon warming the mixture, reaction occurs and selenosemicarbazide crystallises out from the warm solution. After cooling to 20° C., 1.02 g. of selenosemicarbazide M.PT. 180° C. are collected by filtration.

EXAMPLE VI

To a solution of 4.36 g. cyclohexanoneselenosemicarbazone (0.02 mol) in 100 ml. boiling isopropanol are added 0.75 g. of hydrazine hydrate (0.015 mol). After about 15 seconds needles of selenosemicarbazide appear. The mixture is boiled for 5 minutes and, after cooling, 2.36 g. of selenosemicarbazide M.PT. 179° C. are collected by filtration.

EXAMPLE VII

To a solution of 4.36 g. cyclohexanonesemicarbazone (0.02 mol) in 100 ml. boiling isopropanol are added 0.55 g. of hydrazine hydrate (0.011 mol). After one minute needles of a selenosemicarbazide appear. The mixture is boiled for 5 minutes and, after cooling, 2.25 g. of selenosemicarbazide M.PT. 179° C. are collected by filtration.

EXAMPLE VIII

To a solution of 2.32 g. 3-methylcyclohexanonesemicarbazone (0.01 mol) in 50 ml. boiling isopropanol are added 0.5 g. of hydrazine hydrate (0.01 mol), whereupon almost immediately a paste forms. The mixture is boiled for 5 minutes and, after cooling, 1.14 g. of selenosemicarbazide M.PT. 178° C. are collected by filtration.

EXAMPLE IX

To a solution of 4.36 g. cyclohexanone selenosemicarbazone (0.02 mol) in 100 ml. boiling ethanol are added 1.5 g. of β-hydroxyethylhydrazine (0.02 mol), whereupon a precipitate forms. After cooling 2.6 g. of selenosemicarbazide, M.PT. 175–176° C., are collected by filtration. The I.R. spectrum of the product is identical to that of selenosemicarbazide.

EXAMPLE X

To a solution of 4.36 g. cyclohexanone selenosemicarbazone (0.02 mol) in 100 ml. boiling ethanol are added 0.92 g. of methylhydrazine (0.02 mol), whereupon a precipitate forms. After cooling 2.4 g. of selenosemicarbazide, M.PT. 173–174° C., are collected by filtration. The I.R. spectrum of the product is identical to that of selenosemicarbazide.

EXAMPLE XI

To a solution of 4.36 g. cyclohexanone selenosemicarbazone (0.02 mol) in 100 ml. boiling ethanol are added 2.16 g. of phenylhydrazine (0.02 mol). After boiling under reflux for 5 minutes, the solution is cooled and the precipitated crystals 1.5 g. M.PT. 175° C., are collected by filtration. The I.R. spectrum of the product is identical to that of selenosemicarbazide.

EXAMPLE XII

To a solution of 4 g. benzaldehyde selenosemicarbazone in 150 ml. boiling ethanol is added 1.0 ml. of hydrazine hydrate. After boiling under reflux for 10 minutes the solution is cooled and the precipitated crystals (1.0 g.) are collected by filtration. The I.R. spectrum of the product is identical to that of selenosemicarbazide.

EXAMPLE XIII

To a solution of 5 g. of benzyl methyl ketone selenosemicarbazone in 150 ml. boiling ethanol is added 1.0 ml. of hydrazine hydrate, whereupon a precipitate forms. After cooling 2 g. of selenosemicarbazide are collected by filtration. The I.R. spectrum of the product is identical to that of selenosemicarbazide.

EXAMPLE XIV

To a solution of 2.32 g. of cyclohexanone-4-methylselenosemicarbazide (0.01 mol) in 20 ml. boiling ethanol are added 0.5 g. of hydrazine hydrate (0.01 mol). After boiling for 2 minutes the solution is cooled and the precipitated crystals (1.3 g.) are collected by filtration. The I.R. spectrum of the product is identical to that of 4-methylselenosemicarbazide.

EXAMPLE XV

To a solution of 1.5 g. of cyclohexanone-4-phenylselenosemicarbazide (0.01 mol) in 20 ml. boiling ethanol are added 0.25 g. of hydrazine hydrate (0.005 mol). After boiling for 5 minutes the solution is cooled and the precipitated crystals (0.86 g.) are collected by filtration. The I.R. spectrum of the product is identical to that of 4-phenylselenosemicarbazide.

EXAMPLE XVI

To a solution of 1.5 g. cyclohexanone-4-benzylselenosemicarbazone (0.005 mol) in 20 ml. boiling ethanol are added 0.25 g. of hydrazine hydrate (0.005 mol). After boiling for 5 minutes the solution is cooled and the precipitated crystals (0.7 g.) are collected by filtration. The I.R. spectrum of the product is identical to that of 4-benzylselenosemicarbazide.

I claim:

1. A process for the production of a selenosemicarbazide of the formula

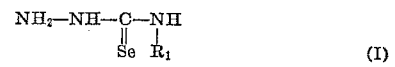

(I)

wherein $R_1$ represents a hydrogen atom or an alkyl, aryl, aralkyl or heterocyclic group, which comprises reacting at a temperature above 20° C. and below 120° C. a selenosemicarbazone of the general formula

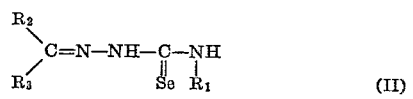

(II)

where $R_1$ has the meaning given above, one of $R_2$ and $R_3$ is a hydrogen atom or an alkyl or aralkyl group and the other of $R_2$ and $R_3$ is an alkyl or aralkyl group or together they represent $(CH_2)_n$, where $n$ is from 4 to 6, with a free hydrazine of the formula:

(III)

wherein $R_4$ is a hydrogen atom, a lower alkyl group, a hydroxy lower alkyl group, an aryl group or an aralkyl group or with a hydrate of a hydrazine of the above formula, in the presence of an inert organic solvent.

2. A process according to claim 1 wherein hydrazine is used.

3. A process according to claim 2 wherein the selenosemicarbazone used is a cyclohexanone-selenesemicarbazone.

4. A process according to claim 3 wherein the inert organic solvent is a poor solvent for the resultant selenosemicarbazide.

5. A process according to claim 4 wherein the inert organic solvent is methanol, ethanol, isopropanol or dioxan.

6. A process according to claim 5 wherein 0.5–1.0 mole of the hydrazine or hydrazine hydrate is used per mole of the selenosemicarbazone.

References Cited
FOREIGN PATENTS 554,031   6/1956   Belgium _____ 260—551

HARRY I. MOATZ, Primary Examiner

U.S. Cl. X.R.

96—61 R